United States Patent [19]
Brandt et al.

[11] 4,413,121
[45] * Nov. 1, 1983

[54] CELLULOSE ETHERS AND CELLULOSE MIXED ETHERS HAVING AT LEAST ONE PHOSPHORUS-CONTAINING SUBSTITUENT, AND PROCESS FOR THEIR MANUFACTURE

[75] Inventors: Lothar Brandt; Arno Holst, both of Wiesbaden; Hans-Jerg Kleiner, Kronberg, all of Fed. Rep. of Germany

[73] Assignee: Hoechst Aktiengesellschaft, Frankfurt am Main, Fed. Rep. of Germany

[*] Notice: The portion of the term of this patent subsequent to Nov. 9, 1999, has been disclaimed.

[21] Appl. No.: 363,148

[22] Filed: Mar. 29, 1982

[30] Foreign Application Priority Data

Mar. 31, 1981 [DE] Fed. Rep. of Germany ....... 3112945

[51] Int. Cl.³ .................. C08B 11/145; C08B 11/193
[52] U.S. Cl. ........................ 536/44; 536/84; 536/90
[58] Field of Search .................. 536/62, 34, 43, 44, 536/84, 90

[56] References Cited

U.S. PATENT DOCUMENTS

| | | | |
|---|---|---|---|
| 2,979,374 | 4/1961 | Drake et al. | 536/84 |
| 3,552,909 | 1/1971 | Vullo | 536/84 |
| 3,634,394 | 1/1972 | Andeassen | 536/43 |
| 3,652,540 | 3/1972 | Determann et al. | 536/84 |
| 3,936,441 | 2/1976 | Holst et al. | 536/44 |
| 4,020,271 | 4/1977 | Chatterjee | 536/88 |
| 4,083,904 | 4/1978 | Sano et al. | 536/62 |
| 4,310,663 | 1/1982 | Hilbig et al. | 536/84 |

FOREIGN PATENT DOCUMENTS

| | | | |
|---|---|---|---|
| 51181 | 5/1982 | European Pat. Off. | 536/90 |
| 51182 | 5/1982 | European Pat. Off. | 536/84 |
| 3039963 | 5/1982 | Fed. Rep. of Germany | 536/90 |
| 899284 | 6/1962 | United Kingdom | 536/62 |
| 973952 | 11/1964 | United Kingdom | |
| 596593 | 2/1978 | U.S.S.R. | |

OTHER PUBLICATIONS

Textile Research Journal, vol. XXIX, Mar. 1959, Number 3.
European Search Report.

*Primary Examiner*—Ronald W. Griffin
*Attorney, Agent, or Firm*—Schwartz, Jeffery, Schwaab, Mack, Blumenthal & Koch

[57] ABSTRACT

Disclosed is a cellulose ether having at least one phosphorus-containing substituent or a mixed ether of said cellulose ether having in addition at least one phosphorus-free substituent comprising alkyl, hydroxyalkyl, carboxyalkyl, sulfonoalkyl, aminoalkyl, or diaminoalkyl, wherein the phosphorus-containing substituent(s) comprise(s) groups of the formula

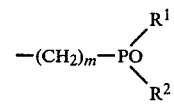

wherein
$R^1$ and $R^2$ are OX; or $R^1$ is OX and $R^2$ is OY; or $R^1$ is OX and $R^2$ is $(CH_2)_n$—$CH_3$; or $R^1$ and $R^2$ are $(CH_2)_n$—$CH_3$; or $R^1$ is $(CH_2)_n$—$CH_3$ and $R^2$ is $(CH_2)_p$—$CH_3$, wherein
X,Y are identical or different and comprise a hydrogen atom or a monovalent cation;
m is an integer from 1 to 4; and
n,p are identical or different and are 0 or 1; with the proviso that when m is 1 or 2, $R^1$ and $R^2$ may not be OX and $R^1$ and $R^2$ may not be OX and OY, respectively. Also disclosed is a process for producing these cellulose ether products.

17 Claims, No Drawings

CELLULOSE ETHERS AND CELLULOSE MIXED ETHERS HAVING AT LEAST ONE PHOSPHORUS-CONTAINING SUBSTITUENT, AND PROCESS FOR THEIR MANUFACTURE

BACKGROUND OF THE INVENTION

The present invention relates to cellulose ethers having at least one phosphorus-containing substituent and to the mixed ethers thereof, and to a process for their manufacture in an aqueous alkaline medium which optionally contains an organic solvent.

Cellulose ethers which carry an anion-active substituent are used in many processes and fields of application, as water-soluble thickening agents and/or as auxiliaries, e.g., as a protective colloid, flocculating agent, binder and adhesive, dispersing agent or film-forming agent. Among these fields of application are the making of paper, the production and application of building materials, the processing of fibers, the preparation of pharmaceuticals and cosmetics, and the production of soaps and detergents, varnishes and paints, and food and luxury food. The best known commercial product of this type of cellulose ether is carboxymethyl cellulose (CMC) which is conventionally marketed in the form of its Na salt (NaCMC). Also gaining a certain importance are other carboxyalkyl ethers or sulfonoalkyl ethers of cellulose and mixed ethers which contain further ether groups in addition to the anion-active substituent, normally carboxymethyl. These include, for example, methyl carboxymethyl cellulose (MCMC), hydroxyethyl carboxymethyl cellulose (HECMC) or ethyl hydroxyethyl carboxymethyl cellulose (EHECMC).

Organic phosphonic acids or their derivatives lend themselves particularly well to the purpose of linking polybasic anion-active substituents to the cellulose ether molecule. The reaction of cellulose with reactive, organic phosphonic acids or derivatives thereof (e.g., halogenoalkane phosphonic acids) results in cellulose ethers which have a phosphonic acid group or one of its salt forms in their ether substituent. These cellulose ethers which contain phosphonic acid groups are often insoluble in water, because reaction, for example, with halogenoalkane phosphonic acids to give more than a very low degree of substitution is difficult. However, water-soluble products have also been disclosed.

U.S. Pat. No. 2,979,374 and the paper "Phosphonomethylation of Cotton" by G. L. Drake, W. A. Reeves and J. D. Guthrie, published in *Textile Research Journal*, March 1959, pages 270 to 275, describe chemically modified, fibrous textile materials based on cellulose and a process for preparing these materials, in which certain of the hydroxyl groups of the polysaccharide are replaced by —O—CH$_2$—PO$_3$X$_2$ groups, wherein X is either H or an alkali metal or NH$_4$. The degree of modification ranges from 0.01 to 4 percent by weight of phosphorus. In the process for the preparation of these products, the fibrous starting material is reacted with an aqueous solution of an alkali metal salt of chloromethane phosphonic acid or another salt of this acid and an excess of alkali metal hydroxide. The products obtained may be further converted to the free acid form or to the corresponding ammonium salts. It is also possible to prepare water-soluble phosphonomethyl ethers of cellulose, if the degree of modification is chosen in such a way that at least 2 percent by weight of phosphorus is introduced. The starting materials mentioned include cotton fibers, cellulose hydrate fibers, aminized cotton fibers, carboxymethylated cotton fibers, paper and sulfonoethylated cotton fibers. For the purpose of introducing the phosphonomethyl groups, either a metal salt of chloromethane phosphonic acid itself or its acid chloride may be used; it is also possible to use the corresponding monoesters or diesters.

The crosslinked phosphonoalkyl celluloses according to German Offenlegungsschrift No. 26 00 930 (corresponding to U.S. Pat. No. 4,020,271) comprise basic molecules of a kind which, without crosslinking, would themselves be water-soluble, but which are rendered substantially water-insoluble by crosslinking with formaldehyde, epichlorohydrin, dichloroacetic acid, diepoxides or other known difunctional components. With respect to carrying out the etherification stage, reference is made to the previously mentioned U.S. Pat. No. 2,979,374.

The methods for the preparation of ion exchangers according to German Auslegeschrift No. 20 05 407 (corresponding to U.S. Pat. No. 3,634,394) or according to German Auslegeschrift No. 20 05 408 (corresponding to U.S. Pat. No. 3,652,540) can also result in products which carry a phosphonomethyl group. In one method, for example, pearls of regenerated cellulose are reacted in toluene in the presence of benzethonium chloride [CH$_3$-C(CH$_3$)$_2$-CH$_2$-C(CH$_3$)$_2$-C$_6$H$_4$-(O-CH$_2$-CH$_2$)$_2$-N$^\oplus$(CH$_3$)$_2$-CH$_2$-C$_6$H$_5$,Cl$^\ominus$] with a solution containing NaOH, NaBH$_4$, water and chloromethane phosphonic acid for 16 hours at a temperature of 90° C. The product obtained is insoluble in water.

The basic cellulose structures of the phosphonopropyl celluloses according to Soviet Union Inventor's Certificate No. 596,593 possess ether substituents of the general formula

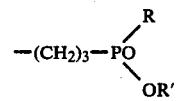

wherein R represents a hydrogen atom or a lower alkoxy group, and R' represents an alkali metal or a lower alkyl group. Thus, these products are neither phosphonic acids or their mono- or disalts, nor are they alkylphosphinic acids or their salts, such as are claimed in this invention. For preparing these compounds, the following procedure is used: allyl cellulose is reacted with alkali metal salts of hypophosphorous acid or with dialkyl phosphites (dialkyl esters of phosphorous acid) in the presence of organic peroxides, at temperatures between 80° and 100° C.

There have also been proposed processes for the preparation of cellulose ethers or cellulose mixed ethers which, as substituents, exclusively contain phosphonomethyl groups with substituents where, on the one hand, the method of processing has been improved as compared with the state of the art described above, while, on the other hand, novel reaction products result in some cases.

The not prepublished German Offenlegungsschrift No. 30 39 978 discloses a process for preparing water-soluble phosphonomethyl ethers of cellulose, which are made from cellulose and halogen methane phosphonic acid or one of its salts or acid derivatives. The reaction medium contains from 2.1 to 15 moles of hydroxide ions and from 0.4 to 3.0 moles of halogenomethane phosphonate ions as the etherifying agent and, in addition, from 3 to 50 parts by weight, per part by weight of cellulose, of a mixture which is composed of water and an organic solvent, such as isopropanol. The degree of substitution ($DS_{PM}$) of the reaction product shall be at least 0.13.

Also, in German Offenlegungsschrift 30 39 963, which has not been prepublished, water-soluble mixed ethers of cellulose are described which contain (a) at least one substituent from the group comprising alkyl, hydroxyalkyl, carboxyalkyl, sulfoalkyl and dialkylaminoalkyl, and (b) a phosphonomethyl substituent. The degree of substitution (DS or, respectively, MS) of the substituents under (a) thereby is from 0.05 to 2.95 for the DS, respectively from 0.5 to 6.0 for the $MS_{HAlk}$, and from 0.005 to 0.8 for the $DS_{PM}$. A process for the preparation of these mixed ethers is carried out in a way similar to that for the preparation of the pure ethers described above.

SUMMARY OF THE INVENTION

It is therefore an object of the present invention to provide novel, especially water-soluble, cellulose ethers which have a phosphorus containing substituent.

A further object of the invention is to provide a process for the preparation of these products, which, in particular, can also be performed at a relatively low temperature and without a considerable chain degradation taking place.

In accomplishing these objects, there have been provided according to one aspect of the present invention cellulose ethers having at least one phosphorus-containing substituent or mixed ethers of these cellulose ethers which are based on at least one phosphorus-free substituent from the group comprising alkyl, hydroxyalkyl, carboxyalkyl, sulfonalkyl, aminoalkyl and diaminoalkyl, which carry, as the phosphorus-containing sustituent(s), groups of the general formula

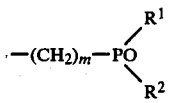

wherein
$R^1$ and $R^2$ are OX; or $R^1$ is OX and $R^2$ is OY; or $R^1$ is OX and $R^2$ is $(CH_2)_n$-$CH_3$; or $R^1$ and $R^2$ are $(CH_2)_n$-$CH_3$; or $R^1$ is $(CH_2)_n$-$CH_3$ and $R^2$ is $(CH_2)_p$-$CH_3$, whereby
X,Y are identical or different and mean a hydrogen atom or a monovalent cation;
m is an integer from 1 to 4; and
n,p are identical or different and mean 0 or 1; with the proviso that, when m is 1 or 2, $R^1$ and $R^2$ may not be OX and $R^1$ and $R^2$ may not be OX and OY, respectively. This "disclaimer" inter alia refers to the compounds described in the prior, not prepublished German Offenlegungsschriften No. 30 39 978 and No. 30 39 963.

The phosphorus-containing substituents to which the above general formula applies include the following groups:
phosphonopropyl or phosphonobutyl ($R^1$, $R^2$=OX or OY, m=3 or 4);
methylphosphinomethyl, methylphosphinoethyl, methylphosphinopropyl, methylphosphinobutyl, ethylphosphinomethyl, ethylphosphinoethyl, ethylphosphinopropyl, ethylphosphinobutyl ($R^1$=OX, $R^2$=$(CH_2)_n$-$CH_3$, m=1 to 4, n=0 or 1);
2-methyl-2-oxo-2-phosphapropyl, 2-methyl-2-oxo-2-phosphabutyl, 2-methyl-2-oxo-2-phosphapentyl, 2-methyl-2-oxo-2-phosphahexyl, 3-methyl-3-oxo-3-phosphabutyl, 3-methyl-3-oxo-3-phosphapentyl, 3-methyl-3-oxo-phosphahexyl, 3-methyl-3-oxo-3-phosphaheptyl, 3-ethyl-3-oxo-3-phosphabutyl, 3-ethyl-3-oxo-3-phosphapentyl, 3-ethyl-3oxo-3-phosphahexyl, 3-ethyl-3-oxo-3-phosphaheptyl ($R^1$, $R^2$=$(CH_2)_n$-$CH_3$ or $(C_2)_p$-$CH_3$, m=1 to 4, n and p=0 or 1.

Where these groups are derived from alkane phosphonic acid or alkyl alkylphosphinic acid, the radical X and/or Y is hydrogen atom or a radical in the form of a monovalent cation. Of the compounds listed above, those are preferred wherein X and/or Y is hydrogen, $Na^+$ or $NH_4^+$; m is 1 or 3; and n or n and p is/are 0. To these belong, inter alia, the groups monosodium phosphonopropyl or monoammonium phosphonopropyl, disodium phosphonopropyl, sodium methyl phospinomethyl, ammonium methyl phosphinopropyl, 2-methyl-2-oxo-2-phosphapropyl or 2-methyl-2-oxo-2-phosphapentyl.

If the compounds according to the present invention are not present as pure cellulose ethers, i.e., as products exclusively possessing one or more phosphorus-containing substituents, but are present as cellulose mixed ethers, i.e., in addition to the phosphorus-containing substituent(s) they possess at least one phosphorus-free substituent (whereby in both cases preference is given to products having phosphorus-containing substituents of one kind only) the terms listed above preferably shall have the following meanings: "alkyl" comprises methyl and ethyl, "hydroxyalkyl" comprises from hydroxyethyl to hydroxybutyl, "carboxyalkyl" comprises carboxymethyl and carboxyethyl, "sulfonoalkyl" comprises sulfonomethyl to sulfonopropyl, "aminoalkyl" comprises aminomethyl to aminopropyl, and "dialkylaminoalkyl" comprises N,N-disubstituted aminomethyl to aminobutyl groups having N-alkyl groups from $C_1$ to $C_5$ (identical or different), whereby the expression "dialkylamino" shall also include N-terminal heterocyclic radicals or quaternary ammonium groupings.

The cellulose mixed ethers according to the present invention preferably comprise cellulose mixed ethers which, in addition to a phosphorus-containing substituent, carry a methyl group, an ethyl group, a hydroxyethyl group, a hydroxypropyl group, and/or carboxymethyl groups as their phosphorus-free substituent. Examples of cellulose mixed ethers according to this invention, which in particular are water-soluble, therefore include the following: hydroxyethyl phosphonopropyl cellulose (HEPPC), methyl (methylphosphinomethyl) cellulose (M(MPM)C), carboxymethyl (methylphosphinopropyl) cellulose (CM(MPP)C), sulfonoethyl phosphonopropyl cellulose, (SEPPC), 2-diethylaminoethyl-(methylphosphinoethyl) cellulose (DEAE(MPE)C), 2-aminoethyl-(2-methyl-2-oxo-2-phosphapropyl) cellulose or (3-trialkylammonio-2-hydroxypropyl) phosphonopropyl cellulose.

The parameters used in this specification for distinguishing the cellulose ethers are to be understood as meaning the following: "DS" is the degree of substitution, i.e., the average number of substituted OH groups per anhydro-D-glucose unit; in cellulose, the DS is in the range from 0.0 to 3. "MS" is the molar degree of substitution, i.e., the average number of moles of the substituting reagent which, per mole of anyhdro-D-glucose unit, have an ether-like bond. In cellulose, the "MS" can exceed 3.0, and it is normally used instead of the "DS" to characterize such substituents on the cellulose ether which may be produced by multiple substitution on an OH group (hydroxyalkyl groups). "$MS_{HE}$" is the MS related to the hydroxyethyl substituent, "$DS_P$" is the DS related to the phosphorus-containing substituent(s), "$DS_{PP}$" is the DS related to the phosphonopropyl substituent, and "$DS_{CM}$" is the DS related to the carboxymethyl substituent.

The cellulose ethers which do not possess a phosphorus-free substituent preferably have a $DS_P$ from about 0.05 to 0.8. The cellulose mixed ethers which additionally possess at least one phosphorus-free substituent preferably have a $DS_P$ from about 0.02 to 0.3. Products which exclusively contain phosphorus-containing substituents are insoluble in aqueous media, if their $DS_P$ lies below about 0.05; if their DS lies above this value, they are soluble in strong bases, such as, e.g., a 2 N aqueous NaOH solution. Starting frm a $DS_P$ of about 0.13 to 0.20, the phosphonoalkyl cellulose and the alkyl phosphinoalkyl cellulose can be at least partially water-soluble at a neutral pH value, whereby the solubility also depends on the structure of the phosphorus-containing substituent, e.g., on whether it is present in the form of an acid or of a salt. The corresponding mixed ethers are preferably water-soluble in neutral media; in addition to at least one phosphorus-containing substituent, they have, e.g., a hydroxyethyl substituent of an $MS_{HE}$ from about 1.3 to 3.0 and/or a carboxymethyl substituent of a $DS_{CM}$ from about 0.3 to 1.5. The term "water-soluble" means that a maximum content of 10% by weight, preferably of 5% by weight, of water-insoluble substances is contained in the products according to this invention. These water-insoluble proportions may, for example, consist of non-etherified cellulose and/or of portions of cellulose ethers showing a degree of substitution which either is too high or too low.

In accordance with a further aspect of this invention, a process has been provided for preparing the compounds according to the invention. The process is characterized by the steps of, for preparing the cellulose ether having at least one phosphorus-containing substituent, reacting from about 0.8 to 15 moles of hydroxide ions, and
from about 0.05 to 3 moles of halogenoalkane phosphonate ions, halogenoalkyl alkylphosphinate ions or halogenoalkyl dialkylphosphane oxide, per mole of cellulose, and for preparing the corresponding mixed ether, additionally reacting from about 0.1 to 25 moles of the etherifying agent(s) for producing the phosphorus-free substituent(s), per mole of cellulose with cellulose, whereby at least about 5 moles of water, per mole of cellulose, and if appropriate an inert, preferably water-miscible organic solvent are present in the reaction medium.

In a preferred embodiment of the process according to this invention, from about 1 to 8 moles of hydroxide ions and
from about 0.1 to 1 mole of halogenoalkane phosphonate ions, halogenoalkyl alkylphosphinate ions or halogenoalkyldialkyl phosphane oxide, per mole of cellulose are reacted with cellulose for preparing the cellulose ether having at least one phosphorus-containing substituent; and for preparing the corresponding mixed ether, additionally from about 0.3 to 20 moles of the etherifying agent(s) for producing the phosphorus-free substituent(s), per mole of cellulose, are reacted with cellulose. Per mole of cellulose, from about 5 to 20 moles of water are thereby present in the reaction medium.

Further objects, features and advantages of the present invention will become apparent from the detailed description of preferred embodiments which follows.

DETAILED DESCRIPTION OF PREFERRED EMBODIMENTS

The preparation of mixed ethers of cellulose or, generally, the preparation of cellulose ethers of a kind which do not carry a phosphorus-containing substituent, has been known for many years, in some cases even for many decades, and it is, therefore, not necessary to describe these processes within the scope of the present invention. As an example, however, "Ullmanns Encyklopädie der technischen Chemie" (Ullmanns Encyclopedia of Technical Chemistry), 4th edition, 1975, volume 9, Verlag Chemie, Weinheim, Federal Republic of Germany, keyword "Celluloseäther" (cellulose ethers), pages 192 to 212, is mentioned.

The process of the invention can be carried out discontinuously or continuously in an apparatus of the type conventionally used in cellulose ether chemistry. If the temperature of the reaction mixture is chosen so high that it exceeds the boiling temperature of the solvent/$H_2O$ mixture, it is advisable to run the process in a pressure apparatus. Also in the case of reaction components which are already in a gaseous state under normal conditions (normal pressure, room temperature), it is usual to conduct the process in a pressure apparatus (for example, if ethylene oxide is used as the etherifying agent).

The specified composition of the reaction mixture merely gives the sum of the portions of components required for the reaction at the beginning of the etherifying stage. In the case of a separate alkalizing stage, for example, part of the cellulose and of the alkali metal hydroxide is then already present as alkali cellulose, and additional water is generated by the neutralization of the etherifying agent, which is employed in the form of an acid, a hydrolizable acid derivative or a hydrogen salt. If the etherifying agents are, for example, used in the form of the monosalt or disalt or of another derivative which can be hydroluzed under alkaline conditions, the required quantities are different from the quantities which must be used for the free acid, i.e., the terms "halogenoalkane phosphonate ions" and "halogenoalkyl alkyl phosphinate ions" have been chosen to have a uniform basis for calculation, and to characterize the condition in which the etherifying agent is predominantly present in the alkaline medium at the beginning of the reaction.

The specified quantity of "hydroxide ions" is only related to the quantity required for alkalization and etherification. The quantity of "hydroxide ions" which is additionally necessary to form the dianion of the etherifying agent must still be added to this.

The cellulose used is either of natural origin, e.g., cotton linters or wood pulp, or is in the regenerated form, e.g., cellulose hydrate. If possible, the cellulose should have a particle size of less than about 2.5 mm, more particularly, less than about 1 mm, before the reaction is started. This particle size can, for example, be attained by grinding the cellulose supplied in longer fibers into "powders".

The "hydroxide ions" are preferably used as alkali metal hydroxide—normally NaOH, but also KOH or LiOH—in a solid form or dissolved as an aqueous alkali metal hydroxide solution. It is, however, also possible to employ quaternary ammonium bases. The process of this invention can be carried out by using water as the only liquid in the reaction medium, but preferably it is performed with the addition of an inert organic solvent, which is preferably miscible with water, so that a more or less moist reaction mixture or a suspension which is capable of flowing is formed.

Suitable inert organic solvents which are preferably miscible with water are, in particular, isopropanol, acetone, dioxane, tert.-butanol, or mixtures of these solvents, which may already be in a water-mixed rate. If the particularly preferred isopropanol is used as the organic solvent, the mixture of solvent/H$_2$O should be adjusted so that the proportion of water ranges from about 5 to 50 percent by weight, especially from about 5 to 30 percent by weight. Recovery and reuse of the particularly preferred isopropanol are relatively easy, because the liquid constituents of the etherification mixture, which are mechanically separated from the solid constituents, e.g., by filtering, decanting or centrifuging, after completion of the etherification, often consist of salt-containing isopropanol/H$_2$O mixtures which allow an easy purification by distillation, so that the organic solvent constituent can be recovered in an environmentally safe way.

Instead of chloroalkane phosphonic acids, chloroalkyl alkyl phosphinic acids or their monosodium salts or disodium salts, which are preferably used as etherifying agents for producing the phosphorus-containing substituent, i.e., for the production of the halogenoalkane phosphonate ions or halogenoalkyl alkyl phosphinate ions, it is also possible to use their derivatives which are hydrolyzable under alkaline conditions, for example, acid chlorides or esters, other soluble salts, such as potassium or ammonium salts, or to use the analogous bromine or iodine compounds, instead of the mentioned chlorine compounds.

The etherifying agents which are preferably used are chloromethyl dimethyl phosphane oxide, chloromethyl methyl phosphinic acid, 3-chloropropylmethyl phosphinic acid, 3-chloropropane phosphonic acid, 3-bromopropane phosphonic acid or a corresponding salt. The reactivity of these agents toward alkali cellulose increases in the above order, chloromethane phosphonic acid or its salt ranging approximately in the middle. Compared with the above compounds, the reactivity of chloroacetic acid is considerably higher.

The preferred etherifying agents for producing the phosphorus-free substituent(s) are methyl chloride, ethyl chloride, ethylene oxide, propylene oxide and/or monochloroacetic acid or a corresponding salt. It is, however, also possible to use butylene oxide-1,2 monochloropropionic acid, chloroethane sulfonic acid, vinyl sulfonic acid, 1-N,N-diethylamino-2-chloroethane or 2,3-epoxypropyltrimethyl ammonium chloride.

In the reaction, the reaction products (except the derivatives of phosphane oxide) are normally first obtained as dibasic phosphonates or monobasic phosphinates, as far as the phosphorus-containing substituent is concerned, which can then be converted into the monobasic phosphonates and/or into the free acids by adding acid. By adding bases, such as a metal hydroxide or ammonium hydroxide, salts can again by produced from the monobasic salt forms or the free acids, respectively. The same applies, of course, also to those phosphorus-free substituents which are first obtained in the form of a salt, for example, the carboxymethyl or the sulfonoethyl substituent.

When the process of the invention is carried out in practice, the cellulose is advisably first alkalized in a mixture of organic solvent, if appropriate, water, and alkali metal hydroxide (or quaternary ammonium base) and the etherifying agent is subsequently added in one or several stages (depending on the kind of etherifying agent used). It is, however, also possible to alkalize in the absence of an organic solvent, which is then added in the etherifying stage(s) only, or to add the entire quantity of alkali metal hydroxide in the etherifying stage(s) which is/are then, simultaneously, the alkalizing stage(s), i.e., separate alkalizing is not necessary in that case. All stages, no matter whether they are carried out as separate alkalizing or etherifying stages or as a combination of the two stages, are usually conducted with good mixing. In the separate alkalizing stage, room temperature is normally used (from about 15° to about 35° C.), while etherification is usually run at temperatures between about 50° and 100° C. If particularly slow-reacting etherifying agents are employed, temperatures of up to 130° C. can be applied. If alkalization and etherification are carried out in a single stage, room temperature can first be applied for some time, before the temperature is raised to the final temperature required for etherification. If the organic solvent is isopropanol and the process is to proceed without the use of pressure units, it is advisable to operate below the boiling temperature (82° C.) of the 87 percent strength azeotropic mixture of isopropanol and H$_2$O. However, if a gaseous etherifying agent is used (such as ethylene oxide or methyl chloride), pressureless operation is not advisable. Depending on the reaction temperature, the time required in the etherification stage generally ranges between about 30 minutes and 8 hours. Preferably after the addition of an acid until the monobasic salt has formed, the crude product is first freed from the major part of its liquid constituents, using a separating device (for example, a centrifuge) and, if necessary, adhering salts can then be removed by extraction. After that, the product is dried and can, optionally, be ground, mixed with further components or granulated. These processing, purifying and post-treating methods are conventionally practiced in cellulose ether chemistry, and it is, consequently, not necessary to describe them in detail.

The process of the invention can also be run in such a way that either cellulose ether having phosphorus-containing substituents only is first separately prepared and is then used instead of cellulose in one or several further etherification reaction(s), or that previously prepared, phosphorus-free cellulose ether which still contains etherifiable OH groups, instead of cellulose, is reacted with phosphorus-containing etherifying agents. As a rule, however, such multi-stage processes for the preparation of mixed ethers are less economical than a "one-pot" process.

The cellulose ethers and cellulose mixed ethers according to this invention can be used in those technical fields which are known from other, optionally anion-active, cellulose ethers and cellulose mixed ethers, as discussed in the introductory portion of the present application.

By reference to the production of phosphonoalkyl celluloses, some statements on the reactivity of the various etherifying agents shall follow. The introduction of ether substituents into the cellulose is carried out, on a large industrial scale, according to the principle of the WILLIAMSON synthesis, by performing a condensation reaction of halogenoalkyl compounds with the polyalcohol cellulose in an alkaline medium, whereby hydrogen halide is split off. Thus, the methyl, ethyl or carboxymethyl ethers are made available as valuable commercial products by reacting alkali cellulose with, for example, methyl chloride, ethyl chloride or a salt of chloroacetic acid. The same process is employed when phosphonomethyl groups are introduced, whereby the etherifying agent used is, e.g., a salt of chloromethane phosphonic acid. In this reagent, however, the reactivity of the halogen is reduced as compared with, e.g., methyl chloride or chloroacetic acid, due to the electron-attracting effect of the phosphonic acid groups. In higher halogenoalkane phosphonic acids $Hal-(CH_2)_n-PO_3H_2$ (with $n>1$ and $Hal=Cl$ or $Br$), this effect should theoretically be less pronounced, and thus their reactivity toward halogenomethane phosphonic acid should be increased. It has been observed, however, that in the case of 2-halogenoethane phosphonic acids an intermolecular splitting off of hydrogen halide seems to take place preferably in the alkaline medium, whereby ethene phosphonic acid (or its salt) is formed. Although, due to the electronegative phosphonic acid radical, the double bond should be activated and thus be capable of undergoing an alkali-catalyzed addition to the OH groups of the cellulose, analogously to, e.g., the double bonds of acrylonitrile or ethene sulfonic acid salt, this addition reaction takes place to a very low degree only, so that neither with 2-halogenoethane phosphonic acid salt nor with ethene phosphonic acid salt is any considerable 2-phosphonoethyl substitution observed. It is only from a $C_3$ chain on, i.e., for example, 3-chloro- or 3-bromopropane phosphonic acid (salt) that an increased reactivity can be stated. It is assumed that, in the case of longer chains, the penetration of the reagent into the structure of the swollen alkali cellulose is impeded, so that the reactivity decreases again.

The present invention also extends to reaction products which, through the crosslinking of the cellulose ethers, additionally are rendered less water-soluble, whereby these crosslinked cellulose ethers are mainly used as ion exchangers or, for hygienic purposes, as absorbent, hydrophilizing additives for an increased absorption of water or water vapor (for example, in diapers, tampons, or other absorbing shapes). Therefore, it is another object of this invention to provide a process for the production of a crosslinked cellulose ether or cellulose mixed ether which is based on one of the above described phosphorus-containing compounds and is water-insoluble to at least 25, preferably at least 40 percent by weight. Crosslinking with an at least bifunctional compound thereby takes place before, simultaneously with or subsequently to etherifying the cellulose, particularly in an alkaline medium. Suitable crosslinking agents which may be used for this purpose are, for example, formaldehyde, epichlorohydrin, dichloroacetic acid, diepoxides and bisacrylamidoderivatives. Thereby it is principally known how to control the reaction; in this connection, reference is made to German Offenlegungsschrift No. 26 00 930 (=U.S. Pat. No. 4,020,271) or to German Offenlegungsschrift No. 23 57 079 (=U.S. Pat. No. 3,936,441), which both have already been mentioned above.

In the following examples, parts by weight are related to parts by volume as the g to the $cm^3$. Percentages are by weight. The viscosities mentioned were determined in a 2 percent strength aqueous solution at 20° C., using a Hoeppler falling ball viscometer.

EXAMPLE 1

In a solids mixer, 10 parts by weight of a ground pine sulfite cellulose having an average particle size of 0.5 mm are thoroughly mixed with a suspension of 7.4 parts by weight of chloromethyl dimethyl phosphane oxide (=0.1 mole per mole of cellulose) in 19.5 parts by weight of a 46.5 percent aqueous NaOH solution (=3.9 moles of NaOH and 10.5 moles of $H_2O$ per mole of cellulose), for 30 minutes at room temperature. Then the mixture is heated to 110° C. for 2 hours. After cooling down, this mixture is suspended in 70 percent aqueous methanol which contains enough acetic acid to neutralize excess NaOH, and is filtered off. Subsequently, the solid residue is washed several times with 70 percent aqueous methanol, and dried at about 70° C. The fibrous 2-methyl-2-oxo-2-phosphapropyl cellulose has a phosphorus content of 2.6 percent (corresponding to a $DS_P$ of 0.15), is easily swellable in water and gives a clear solution in an 8 percent aqueous NaOH solution.

When 14.0 parts by weight of a 25.0 percent aqueous NaOH solution are employed for the reaction (=1.5 moles of NaOH per mole of cellulose), instead of 19.5 parts by weight of a 46.5 percent aqueous NaOH solution, while the other conditions and quantities remain unchanged, the product obtained contains less than 0.3 percent of phosphorus (corresponding to a $DS_P$ of less than about 0.02) and is insoluble in an 8 percent aqueous NaOH solution.

EXAMPLE 2

2-methyl-2-oxo-2-phosphapropyl cellulose is prepared as indicated in Example 1. The still moist product is substantially freed from methanol by rinsing with practically anhydrous isopropanol, and suspended in 65 parts by weight of a 90 percent aqueous isopropanol. After adding 7.5 parts by weight of a 50 percent aqueous NaOH solution (=1.6 moles of NaOH and 9.8 moles of $H_2O$), mixing is performed for 30 minutes at room temperature in a kneader. Thereafter, 8.8 parts by weight of Na-monochloroacetate (=1.3 moles) are added. This reaction mixture is heated to a temperature of 75° C. while mixing. The second etherification is carried out at this temperature for 1 hour. The re-neutralization and the further processing are performed as indicated in Example 1 for the pure ether. The mixed ether which is thus formed is sodium carboxymethyl-(2-methyl-2-oxo-2-phosphapropyl) cellulose and has a $DS_P$ of 0.15 and a $DS_{CM}$ of 0.74. It gives a clear solution in water and has a viscosity of 60 mPas.

EXAMPLE 3

10 parts by weight of a ground beech pulp having an average particle size of 0.5 mm are suspended in 180 parts by weight of a substantially anhydrous isopropanol. 28.5 parts by weight of a 50 percent aqueous NaOH solution (=4.1 moles of NaOH and 16.2 moles of $H_2O$) are added, and the mixture is stirred at room temperature. Then 15.2 parts by weight of chloromethyl methylphosphoric acid (=2.0 moles) are added, and the mixture is heated to 80° C. This reaction is continued for 3 hours. After cooling down, neutralizing with acetic acid to a pH value of about 8 to 9, filtering, repeated rinsing with 50 percent aqueous isopropanol and drying, a fibrous sodium methylphosphinomethyl cellulose is obtained which has a phosphorus content of 2.2 percent (corresponding to a $DS_P$ of 0.13), which is weakly swellable in water, and which gives a clear solution in an 8 percent aqueous NaOH solution.

EXAMPLE 4

The procedure is carried out as indicated in Example 3, with the exception that 18.5 parts by weight of the etherifying agent 3-chloropropyl methyl phosphonic acid (=2 moles) are used. The sodium-3-(methylphosphino)-propyl cellulose obtained has a phosphorus content of 2.3 percent (corresponding to a $DS_P$ of 0.13). It is soluble in water to about 60 percent, in an 8 percent aqueous NaOH solution it gives a clear solution.

EXAMPLE 5

10 parts by weight of pine sulfite pulp are suspended in a solution of 2.3 parts by weight of chloromethyl methyl phosphinic acid (=0.31 moles) in 61 parts by weight of substantially anhydrous isopropanol and mixed with 15.7 parts by weight of a 20.4 percent aqueus NaOH solution (=2.8 moles of NaOH and 12.8 moles of $H_2O$) for 40 minutes at room temperature. After the addition of 11.6 parts by weight of ethylene oxide (=5.0 moles), etherification is carried out in a pressure kneader, for 1 hour at 30° C., then for 30 minutes at 70° C., and finally for 1 hour at 90° C. After cooling down, neutralizing, filtering, repeated rinsing with 80 percent aqueous isopropanol, and drying, a hydroxyethyl-(methylphosphinomethyl) cellulose in the form of the Na salt is obtained, which has a $MS_{HE}$ of 2.3 and a $DS_P$ of 0.02. It gives a clear solution in water and has a viscosity of 6,200 mPas.

EXAMPLE 6

The same procedure as indicated in Example 5 is repeated, with the exception that as one of the etherifying agents 2.8 parts by weight of 3-chloropropyl methylphosphinic acid (=0.31 mole) are used. Hydroxyethyl-(3-methyl phosphinopropyl) cellulose in the form of the Na salt is obtained. It has an $MS_{HE}$ of 2.3 and a $DS_P$ of 0.09, it gives a clear solution in water and it has a viscosity of 10,400 mPas.

EXAMPLE 7

10 parts by weight of pine pulp are mixed in a kneader with 39 parts by weight of practically anhydrous isopropanol and 18 parts by weight of a 42.6 percent aqueous NaOH solution (=2.1 moles of NaOH and 11.6 moles of $H_2O$) for 40 minutes at room temperature. Then the solution obtained from 5.5 parts by weight of 3-chloropropane phosphonic acid (=0.6 mole) in 10 parts by weight of the isopropanol is added, and etherification is performed for 5 hours at 60° C. The neutralization and further treatment are carried out as described in Example 3. The monosodium-3-phosphonopropyl cellulose thus obtained has a $DS_P$ of 0.16. It is soluble in water to about 70 percent, and there are practically no residues left when it is dissolved in an 8 percent aqueous NaOH solution.

EXAMPLE 8

The same process is employed as in Example 7, with the exception that 7.1 parts by weight of 3-bromopropane phosphonic acid (=0.6 mole) are used as the etherifying agent. The product obtained has the same structure and characteristics as the product described in Example 7.

EXAMPLE 9

In a kneader, 10 parts by weight of a commercially available water-soluble hydroxyethyl cellulose (prepared by using about 1.0 mole of NaOH and about 5 moles of ethylene oxide per mole of cellulose in an isopropanol/$H_2O$ mixture), having an $MS_{HE}$ of 2.5 and a viscosity of 6,600 mPas, are suspended in 29 parts by weight of practically anhydrous isopropanol and mixed at room temperature with 7.2 parts by weight of a 19.4 percent aqueous NaOH solution (=0.57 mole of NaOH and 9.2 moles of $H_2O$) for 20 minutes. After adding 1.1 parts by weight of 3-chloropropane phosphonic acid (=0.19 mole) the second etherification takes place at 50° C. for 3 hours. The further processing is carried out as described in Example 5. A hydroxyethyl-3-phosphonopropyl cellulose is obtained, which is available in the form of the Na salt and has a $DS_P$ of 0.06. It gives a clear solution in water and has a viscosity of 2,500 mPas.

EXAMPLE 10

The process is the same as indicated in Example 9, except that 1.8 parts by weight of 3-bromopropane phosphonic acid (=0.24 mole) and an aqueous NaOH solution, in a quantity of 0.47 mole of NaOH and 9.3 moles of $H_2O$, are employed. The product obtained has the same structure and solubility as that of Example 9, but its $DS_P$ is 0.10, i.e, it has a higher phosphorus content.

What is claimed is:

1. A cellulose ether having at least one phosphorus-containing substituent or a mixed ether of said cellulose ether having in addition at least one phosphorus-free substituent comprising alkyl, hydroxyalkyl, carboxyalkyl, sulfonalkyl, aminoalkyl, or diaminoalkyl, wherein the phosphorus-containing substituent(s) comprise(s) groups of the formula

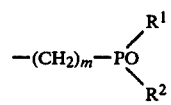

wherein
$R^1$ and $R^2$ are OX; or $R^1$ is OX and $R^2$ is OY; or $R^1$ is OX and $R^2$ is $(CH_2)_n$-$CH_3$; or $R^1$ and $R_2$ are $(CH_2)_n$-$CH_3$; or $R^1$ is $(CH_2)_n$-$CH_3$ and $R^2$ is $(CH_2)_p$-$CH_3$, whereby X,Y are identical or different and comprise a hydrogen atom or a monovalent cation;
m is an integer from 1 to 4; and
n,p are identical or different and are 0 or 1; with the proviso that when m is 1 or 2, $R^1$ and $R^2$ may not be OX and $R^1$ and $R^2$ may not be OX and OY, respectively.

2. A compound as claimed in claim 1, wherein in the formula X and/or Y are hydrogen, $Na^+$ or $NH_4^+$; m is 1 or 3; and n or n and p are 0.

3. A compound as claimed in claim 1 or 2, comprising a mixed ether including a phosphorus-free substituent comprising a methyl, ethyl, hydroxyethyl, hydroxypropyl or carboxymethyl substituent or a mixture thereof.

4. A compound as claimed in claim 1 or 2, wherein the degree of substitution ($DS_P$), related to the phosphorus-containing substituent(s) in the cellulose ether, varies between about 0.05 and 0.8.

5. A compound as claimed in claim 1 or 2, wherein the degree of substitution ($DS_P$), related to the phosphorus-containing substituent(s) in the cellulose ether, varies between about 0.02 and 0.3.

6. A compound as claimed in claim 3, wherein the cellulose mixed ether comprises as the phosphorus-free substituent, a hydroxyethyl substituent having a $MS_{HE}$ of between about 1.3 and 3 and/or a carboxymethyl substituent having a $DS_{CM}$ of between about 0.3 and 1.5.

7. A process for the preparation of a compound as claimed in claim 1, comprising the step of reacting
from about 0.8 to 15 moles of hydroxide ions, and
from about 0.05 to 3 moles of halogenoalkane phosphonate ions, halogenoalkyl alkylphosphinate ions or halogenoalkyl dialkylphosphane oxide, per mole of cellulose, with cellulose, in the presence of a solvent comprising at least five moles of water per mole of cellulose in the reaction medium.

8. A process as claimed in claim 7, further comprising reacting
from about 0.1 to 25 moles of an etherifying agent for producing the phosphorus-free substituent, per mole of cellulose.

9. A process as claimed in claim 7, wherein for preparing the cellulose ether having at least one phosphorus-containing substituent,
from about 1 to 8 moles of hydroxide ions, and
from about 0.1 to 1 mole of halogenoalkane phosphonate ions, halogenoalkyl alkylphosphinate ions or halogenoalkyl dialkyl phosphane oxide
are reacted with cellulose per mole of cellulose.

10. A process as claimed in claim 9, wherein for preparing the corresponding mixed ether, additionally
from about 0.3 to 20 moles of an etherifying agent for producing the phosphorus-free substituent(s)
are reacted with cellulose, per mole of cellulose.

11. A process as claimed in claim 9 or 10, wherein from about 5 to 20 moles of water are present in the reaction medium per mole of cellulose.

12. A process as claimed in claim 7 or 8, wherein the solvent further comprises an inert organic solvent.

13. A process as claimed in claim 12, wherein the organic solvent comprises isopropanol.

14. A process as claimed in claim 8, wherein the etherifying agent(s) used for producing the phosphorus-free substituent(s) comprise methyl chloride, ethyl chloride, ethylene oxide, propylene oxide, and/or monochloroacetic acid or a corresponding salt thereof.

15. A process as claimed in claim 7, wherein the etherifying agent(s) used for producing the phosphorus-containing substituent(s) comprise(s) chloromethyl dimethylphosphane oxide, chloromethyl methylphosphinic acid, 3-chloropropyl methylphosphinic acid, 3-chloropropane phosphonic acid, 3-bromopropane phosphonic acid or a corresponding salt thereof.

16. A process as claimed in claim 7, wherein the etherifying reaction for producing the phosphorus-containing substituent(s) is carried out at a temperature of up to about 130° C.

17. A process for the preparation of a crosslinked cellulose ether or cellulose mixed ether which is water-insoluble to at least 25 percent by weight, comprising the step of crosslinking with an at least bifunctional compound before, simultaneously with or subsequent to the etherification reaction of the cellulose as defined in the process of claim 7.

* * * * *